G. H. S. Duffus,
Distilling Petroleum,
Nº 46,089. Patented Jan. 31, 1865
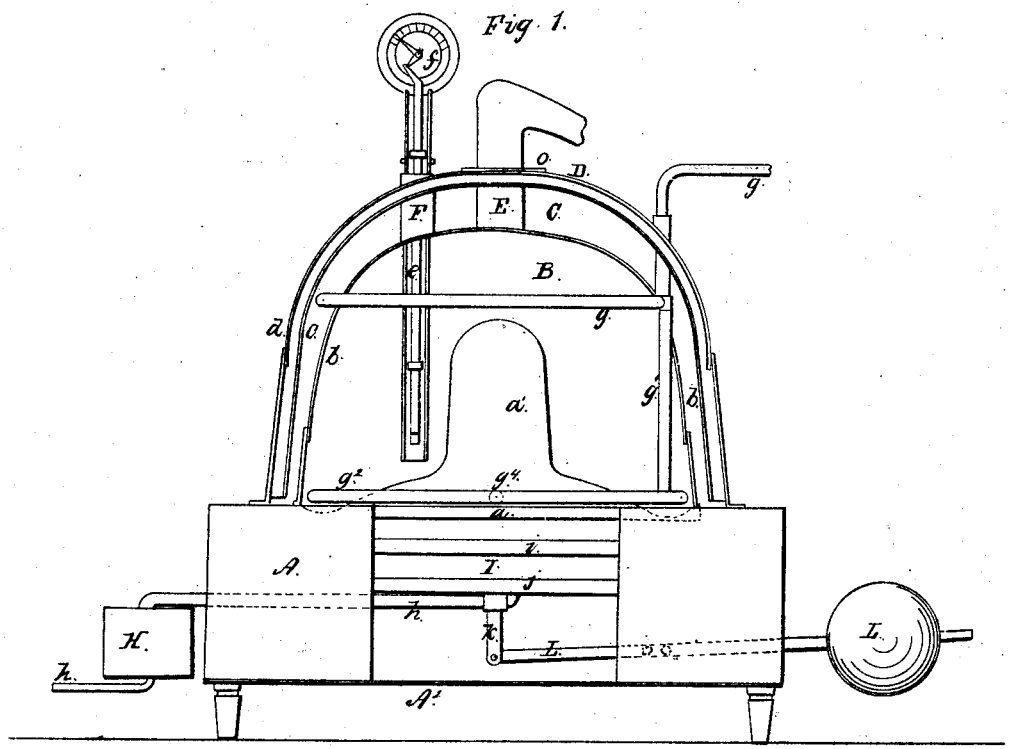
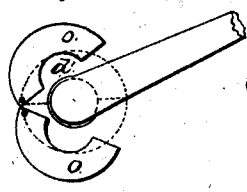
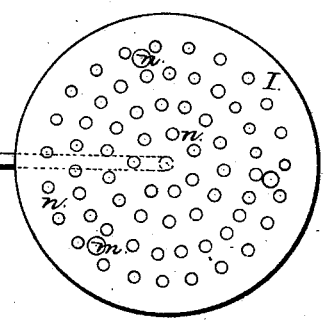
Witnesses:
M. M. Livingston
Inventor:
George H. S. Duffus

UNITED STATES PATENT OFFICE.

GEO. H. S. DUFFUS, OF NEW ORLEANS, LOUISIANA.

IMPROVEMENT IN RETORTS FOR DISTILLING PETROLEUM.

Specification forming part of Letters Patent No. 46,089, dated January 31, 1865.

*To all whom it may concern:*

Be it known that I, GEORGE H. S. DUFFUS, of New Orleans, in the parish of Orleans and State of Louisiana, have invented new and useful Improvements in Retorts for Distilling Petroleum and other Uses; and I do hereby declare that the following is a full, clear, and exact description thereof, which will enable others skilled in the art to make and use the same, reference being had to the accompanying drawings, forming part of this specification, in which—

Figure 1 represents a sectional elevation of the walls of a still, showing my improvements, the line of section being vertical in a plane passing down at one side of the center, most of the other parts being shown in elevation. Fig. 2 is a view in detail of the damper O. Fig. 3 is a plan view of the plate *j* of the furnace I. Fig. 4 is an enlarged view of one of the cones with which the furnace is furnished between the plates *i* and *j*.

Similar letters of reference indicate like parts.

Many attempts have been made to improve the processes and the apparatus used in rectifying crude oils. The best attempts have not succeeded in reducing the time of vaporizing below an average of four hours, nor in reducing the tar residuum below an average of twelve per cent. of the charge.

By means of my invention, hereinafter described, the contents of the still begin to vaporize in about one-half an hour, and the amount of tar left in the still is reduced to less than three per cent. of the charge.

The drawings show so much of the still and furnace as illustrates my invention.

A is the supporting-base of the still, and A' the floor of the furnace. The front of the furnace may have a door (not shown) to allow access to be had to its interior, and the walls of the base A may be perforated on every side and the perforations fitted with dampers for the admission of air to support combustion. The bottom plate, *a*, of the retort rests upon the base A, and its contour is shown in Fig. 1, the outer edge taking the form of a gutter, as seen in dotted outline, to receive and retain any residuum of the distillation and any foreign substance that may make their way into the retort, and thence rising in a spherical form or with an ascending curve, *x*, for a distance of about two-thirds the length of its radius, when it suddenly rises into a dome, *a'*, of conical or other shape, reaching about two-thirds of the height of the retort. My object in constructing the bottom of the retort in this way is to create more heating-surface and to cause the charge in the retort to surround a combustion-chamber in which the unconsumed gases will collect and where they will be liable to be ignited before they can escape therefrom, thereby exposing the charge to the action of heat not only about the circumference, but also high up in the center of the retort. The outer wall, *b*, of the retort joins the bottom plate, *a*, at its outer edge, and extends thence upward in a circular form, as shown. Another wall, *c*, secured either to the base A or to the outer wall, *d*, surrounds the retort, as shown, leaving a flue-space, C, between their sides, about six inches in depth, in a still of the capacity of three thousand gallons. The outer wall, *d*, is secured to the base A, and the space inclosed within it and the wall *c* is filled with any suitable non-conducting substance or composition, D. I have made a composition made of one part of plaster-of paris and two parts of wood-ashes, by measure, mixed to a proper consistency with water. The walls *d* and *c* are to be secured together by means of bolts, and the apertures through them to receive the case of the gage and the steam-pipe *g* are to be properly fitted with collars and packed air-tight. The pipe of the worm fits in an open collar or pipe which springs from the crown of the shell *b* of the retort, and which is a continuation thereof. This collar passes up through the flue-space C, and through an opening, *d'*, larger than the collar, to a line flush with the top or crown of the outer wall, *d*. The annular space left around the collar is covered at pleasure by dampers O, which swing around hinges so as to close the space more or less completely. The gage-tube passes through all the walls into the retort and down almost to its floor. It is shown here in section; but in practice it is a tight case, except at its upper end, where the expansion-rod emerges from the tube. This expansion-rod is made in any of the usual forms, and any kind of thermostat or gage may be used instead of the gage shown. I use an expansion-rod composed of two-thirds zinc and one-third copper. A steam-pipe, *g*, is conducted through the outer walls into the flue-space, whence it is continued in a horizontal direction to the left, almost around the retort, until it connects with the vertical pipe $g'$, which conducts the steam into the perforated horizontal pipe $g^2$, which lies over the trough or gutter of the bottom plate of the retort, being supported over it upon rods (not shown) which lie across the gutter. The vertical pipe $g'$ is passed through the wall $b$ of the retort, and the joint thus made should be securely packed, so that air shall not be admitted within the retort. At the opposite side or back part of the still a collar, $g^4$, (shown in red outline,) is passed, well packed, from within the retort through all the walls of the still to receive a stop-cock and its pipe. The furnace is to be supplied with gas or its equivalent for fuel through a gas-pipe, $h$, which is carried through the water-packing or other box, H, as shown in the drawings, to prevent the escape of the gas. The gas-pipe $h$ enters the burner or furnace from below, and it is secured to its lower plate, $j$, by a metallic strap, which projects downward, and takes the shape of a forked standard, to which the inner end of the balance-lever L is hinged. This lever has its fulcrum within the walls of the base A, and carries a weight at its outer end to counteract the weight of the burner or furnace I, which is wholly sustained upon the inner end of the lever. The furnace is an annular hollow box, whose top and bottom plates, $i$ and $j$, are perforated, as seen in the drawings, where the plate $i$ is shown for an example of both. The plates are firmly bolted together by bolts $m$, and are perforated with holes $n$, which occur opposite to each other, and are connected by mineral tubes P, of a conical shape, one of which is shown in Fig. 4 enlarged to the full size used by me in one of my stills. These tubes thus form air-passages through the burner or furnace I. Those which I now use are Kraus's patented gas-burners, made of such material and so constructed as to be pervious to gas admitted within the burner I through the pipe $h$, the operation being that the gas makes its way through the walls of the tubes P, which cover the holes $n$ of the plate, and mixes with the ascending currents of air, and they are ignited as they issue through the upper part of the tubes. The steam-pipe $g^2$ is perforated, as shown, at its bottom with more or less holes for the purpose of cleansing the bottom of the retort. The steam, being admitted to the pipe under pressure, escapes through the holes in the pipe $g^2$ and dissolves and removes impurities and foreign matters and tar, if any, which may be deposited in the gutter of the retort or adhere to it and the adjacent parts. The steam is therefore allowed to blow off through the cock of the pipe $g^4$, (shown in red outline,) and which is to be near the outer edge of the gutter. A man-hole (not shown) is to be furnished in the top of the still for charging the retort. The heater or furnace I is to be adjusted at such a distance below the bottom of the retort as to produce the requisite degree of heat in the operations of the still. As it is suspended against the weight, it is evident that if the latter is moved toward the end of the lever the heater will be brought nearer to the retort, and vice versa. I can also moderate the heat by lessening the flow of gas through the pipe $h$ in combination with the movement of the heater or burner.

In working the still with my improvements I fill the retort with crude oil so as to cover the top of the dome, say, to a distance of half-way between its top and the crown of the retort. The still then being made ready in other respects, gas or its equivalent is passed into the interior of the heater I, where it becomes mixed with the atmospheric air, as a supporter of combustion, and issues thence through the holes in the top plate, $i$, where it is ignited. The flames and hot vapors and products of combustion strike against the bottom of the retort and have a tendency to move upward along its rising wall toward the interior of the dome $a'$, which, according to a well-known law of physics, will be always full of those vapors and gases which are most highly heated, and therefore the lightest. As these gases lose heat, they fall and are replaced by other currents, and the cooler currents will be forced outward into the flue-space which communicates around the whole or greater part of the circumference of the still with the space beneath the retort, and they pass away through the opening or damper O. After the fire is started, I bring the heat up to 120°, or thereabout, by the gage, which in my still takes about one-half an hour, when the naphtha begins to come off. The heat is afterward gradually increased, it being allowed to run up to nearly 300°, but not above that, until all the naphtha has come off, and the oil begins to pass the worm. When the naphtha has all passed off, I increase the heat gradually to 500°, or thereabout, and maintain it about at that temperature until the charge in the still is exhausted, during the whole of which stage oil fit for illuminating purposes, and of an excellent quality, passes through the worm. If heated beyond that point, the material is changed in character. There is a very small percentage of residuum left in the retort, because the crude oil is kept at the same temperature throughout its mass, and therefore it cannot be burned on the bottom and along the sides of my still, as in stills of other constructions. When the the charge is not heated equally, or the heat is not diffused equally throughout its mass, some portions of the oil are at a higher temperature than is required to vaporize it, and such portions are consequently burned to tar, which falls to the bottom of the retort, to be heated over and over, making a heavy vapor which mingles with the lighter vapors, and the distilled product, when afterward treated in the agitator, leaves a greater amount of tar in the refuse than in distillations which are produced from oil not burned. The oil run off from my still requires a less amount of acid, and takes a less time to settle.

My furnace and the method which I have invented for operating it enable me to regulate the temperature to suit the different gravities of the oil as it comes over, while with an ordinary furnace the heat varies as the fire is renewed or dies away.

In case of accident I can discontinue the action of my furnace instantaneously by shutting off the gas, thereby saving the labor of hauling the fire or of extinguishing it by gas or water from the boiler or otherwise.

One man can attend ten or a dozen stills of my construction.

My still can be cooled off and ready for cleaning within one hour after the charge is run off, whereas a still of the usual style requires with the best setting three to six hours before it is safe to open it, after the charge is run off.

An ordinary result of my still is to obtain sixteen per cent. of naphtha, eighty-one per cent. of illuminating-oil, and three per cent. of tar, while it is common to find even a less percentage of tar in the retort.

My improvements are also applicable to the making of gas and oils from coal and carboniferous shale or other solid substances, the retort being in such case made of sufficient strength and the steam-pipe being so protected or combined with the walls of the retort as not to be liable to injury from contact with the coal, and I intend to use my improvements in the manufacture of gas and oils from these materials.

I claim as new and desire to secure by Letters Patent—

1. In stills for rectifying petroleum and other oils or producing illuminating or other oils or gases from any substances capable of treatment by heat, covering the still with a jacket inclosing or composed of non-conducting materials, substantially as described.

2. The use in stills for rectifying petroleum and other oils, or for producing illuminating or other oils or gases from any substances capable of treatment by heat, of steam for the purpose of cleaning the retort, substantially as described.

GEORGE H. S. DUFFUS.

Witnesses:
M. M. LIVINGSTON,
THEO. TUSCH.